United States Patent
Kageyama

(10) Patent No.: US 8,731,778 B2
(45) Date of Patent: May 20, 2014

(54) VEHICLE STEERING APPARATUS

(75) Inventor: Hiromitsu Kageyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 615 days.

(21) Appl. No.: 13/059,184

(22) PCT Filed: Jul. 22, 2009

(86) PCT No.: PCT/IB2009/006303
§ 371 (c)(1),
(2), (4) Date: Feb. 15, 2011

(87) PCT Pub. No.: WO2010/020844
PCT Pub. Date: Feb. 25, 2010

(65) Prior Publication Data
US 2011/0144864 A1    Jun. 16, 2011

(30) Foreign Application Priority Data
Aug. 21, 2008    (JP) .................. 2008-212442

(51) Int. Cl.
*B62D 5/00*    (2006.01)
*B62D 15/00*    (2006.01)

(52) U.S. Cl.
USPC ............. 701/41; 701/69; 180/204; 180/408; 180/409; 180/410; 180/445; 180/446

(58) Field of Classification Search
USPC ............. 701/41, 36, 69; 180/79.1, 79.3, 140, 180/148, 151, 153, 154, 159, 160, 161, 79, 180/142, 163, 204, 400, 408–411, 445, 446, 180/443, 89.11; 280/91, 94
See application file for complete search history.

(56) References Cited

U.S. PATENT DOCUMENTS 5,508,921 A  *  4/1996  Chikuma et al. ................ 701/41

FOREIGN PATENT DOCUMENTS

| DE | 102 17 716 | 11/2003 |
|----|------------|---------|
| EP | 0 563 885  | 10/1993 |
| JP | 61 241277  | 10/1986 |
| JP | 62 1675    | 1/1987  |
| JP | 62 139761  | 6/1987  |
| JP | 3 82679    | 4/1991  |
| JP | 5 116640   | 5/1993  |
| JP | 5 124536   | 5/1993  |
| JP | 6 115443   | 4/1994  |
| JP | 6 122377   | 5/1994  |
| JP | 7 291138   | 11/1995 |

(Continued)

OTHER PUBLICATIONS

International Search Report issued Oct. 19, 2009 in PCT/IB09/06303 filed Jul. 22, 2009.

(Continued)

*Primary Examiner* — Adam Tissot
(74) *Attorney, Agent, or Firm* — Oblon, Spivak, McClelland, Maier & Neustadt, L.L.P.

(57) ABSTRACT

An electronic control unit determines the steering direction of rear wheels on the basis of the turning operation direction of a steering wheel when a detected vehicle speed is "0", i.e. when the vehicle is stopped. If the steering direction of the rear wheels is a return-side steering direction to obtain a neutral steering position, the unit operates a rear wheel-side steering mechanism by driving and controlling an electric motor, whereby allowing return-side stationary steering for the rear wheels.

7 Claims, 3 Drawing Sheets

(56) References Cited

FOREIGN PATENT DOCUMENTS

| | | |
|---|---|---|
| JP | 2001 80537 | 3/2001 |
| JP | 2005 178572 | 7/2005 |
| JP | 2007 230427 | 9/2007 |

OTHER PUBLICATIONS

Office Action issued Jun. 25, 2010 in Japanese Patent Application No. 2008-212442, filed Aug. 21, 2008 (with partial English-language translation).

* cited by examiner

VEHICLE STEERING APPARATUS

BACKGROUND OF THE INVENTION

1. Field of the Invention

The invention relates to a vehicle steering apparatus having a steering wheel operated by a driver and a rear wheel-side steering driving mechanism that steers rear wheels in accordance with the operation of the steering wheel.

2. Description of the Related Art

Japanese Patent Application Publication No. 7-291138 (JP-A-7-291138), for instance, discloses a vehicle steering apparatus in which energization of an electric motor that drives a rear wheel steering mechanism is discontinued, and the rear wheels are restored to a steering neutral position by way of a centering spring, when vehicle speed drops to "0".

Japanese Patent Application Publication No. 2001-80537 (JP-A-2001-80537), for instance, discloses a four-wheel steering apparatus in which rear wheels are not steered, by keeping a rear wheel power cylinder in a non-output state, while a vehicle remains stopped, even if a front wheel steering mechanism is operated.

Japanese Patent Application Publication No. 6-122377 (JP-A-6-122377), for instance, discloses a rear wheel apparatus in which a torque accumulating means, for accumulating torsional force in the rotation direction, is provided on a rotary shaft that transmits input revolutions from front wheel power steering to rear wheel power steering, such that the revolutions of a rear rotary shaft that is provided more rearward than the torque accumulating means are restricted when the vehicle is stopped, and are unrestricted when the vehicle starts moving.

In four-wheel steering vehicles where the rear wheels can be steered, the rear wheels are ordinarily kept in a neutral steering position or, alternatively, steering of the rear wheels is not allowed, when the vehicle is stopped, as disclosed in JP-A-7-291138, JP-A-2001-80537 and JP-A-6-122377.

However, in the vehicle steering apparatus disclosed in, for instance, JP-A-7-291138, the rear wheels are returned to the neutral steering position by a centering spring when the vehicle is stopped. This results in a more complex rear wheel steering mechanism. During vehicle cruising, moreover, the electric motor must steer the rear wheels against the elastic force of the centering spring at all times. The output of the electric motor must be accordingly greater, which may result in a larger electric motor size and in increased power consumption.

In the four-wheel steering apparatus disclosed in JP-A-2001-80537 and the rear wheel steering apparatus disclosed in JP-A-6-122377, moreover, steering of the rear wheels is not allowed when the vehicle is stopped, regardless of the steering of the front wheels (or by way of operation of the steering wheel). As a result, the rear wheels remain steered to a position removed from the neutral steering position when, for instance, the vehicle is stopped, even if the front wheels have returned to the neutral steering position. This may be unaesthetic and may cause the vehicle to meander for an instant when the vehicle starts moving again. Preferably, therefore, the rear wheels as well should be returned to the neutral steering position when the vehicle is stopped.

SUMMARY OF THE INVENTION

The invention provides a vehicle steering apparatus, having a simple construction, that allows returning the steering position of rear wheels to a neutral steering position when a four-wheel steering vehicle is stopped.

A vehicle steering apparatus according to an aspect of the invention is a vehicle steering apparatus having a steering wheel operated by a driver, and a rear wheel-side steering driving mechanism provided with an actuator that steers rear wheels in accordance with operation of the steering wheel, said vehicle steering apparatus having vehicle speed detection means for detecting a vehicle speed; vehicle stop state determining means for determining whether the vehicle is in a stop state on the basis of the vehicle speed detected by the vehicle speed detection means; steering direction determining means for determining a steering direction of the rear wheels when the vehicle stop state determining means determines that the vehicle is in a stop state; and steering control means for steering the rear wheels in a return-side steering direction by operating an actuator of the rear wheel-side steering driving mechanism when the steering direction determining means determines that the steering direction of the rear wheels is the return-side steering direction to obtain a neutral steering position for preserving a straight travelling state of the vehicle.

In the vehicle steering apparatus according to the above aspect, the steering control means may discontinue the operation of the actuator of the rear wheel-side steering driving mechanism when the steering direction determining means determines that the steering direction of the rear wheels is a turning-side steering direction away from the neutral steering position.

In the vehicle steering apparatus according to the above aspect, the steering direction determining means may determine the steering direction of the rear wheels on the basis of an operation direction of the steering wheel.

In the vehicle steering apparatus according to the above aspect, the actuator of the rear wheel-side steering driving mechanism may be a motor that generates a driving force for steering the rear wheels.

In the vehicle steering apparatus according to the above aspect, when the steering direction determining means determines that the steering direction of the rear wheels is a return-side steering direction to obtain a neutral steering position for preserving a straight running state of the vehicle, the steering control means may steer the rear wheels in the return-side steering direction up to the neutral steering position.

The vehicle steering apparatus according to the above aspect may be a four-wheel steering apparatus.

Thus, the rear wheels are steered in the return-side steering direction by operating the actuator of the rear wheel-side steering driving mechanism when the steering direction of the rear wheels is determined to be the return-side steering direction, with the vehicle in a stop state. In other words, the rear wheels are not operated, by discontinuing the operation of the actuator of the rear wheel-side steering driving mechanism, when the steering direction of the rear wheels is the turning-side steering direction.

This allows steering the rear wheels towards the neutral steering position, when the vehicle is stopped, by using an actuator originally provided in the rear wheel-side steering driving mechanism for steering the rear wheels. As a result, a centering spring need not be provided in the rear wheel-side steering driving mechanism, the construction of which can thus be simplified.

In a situation where the rear wheels are steered against the frictional force of the tires and the road surface when the vehicle is stopped, the force required for steering the rear wheels in the turning-side steering direction is believed to be greater than the force necessary for steering the rear wheels in the return-side steering direction. In order to steer the rear wheels both in the return-side steering direction and the turning-side steering direction when the vehicle is stopped, therefore, the actuator of the rear wheel-side steering driving mechanism must be capable of generating the force necessary to steer the rear wheels in the turning-side steering direction.

Herein, the force required for steering the rear wheels, and which the actuator of the rear wheel-side steering driving mechanism must generate, can be made smaller by steering only the rear wheels in the return-side steering direction when the vehicle is stopped. This allows reducing the output of the actuator of the rear wheel-side steering driving mechanism, and allows hence reducing the size of the actuator while substantially curbing power consumption. The force required for steering the rear wheels is smaller when the vehicle is cruising than when the vehicle is stopped. Thus, the rear wheels can be steered in the return-side steering direction and the turning-side steering direction using a smaller actuator when the vehicle is cruising.

When the vehicle is stopped, steering the rear wheels only in the return-side steering direction allows the rear wheels to be kept in the neutral steering position. This allows preserving the aesthetics of the stopped vehicle and allows preventing the vehicle from meandering when the latter starts moving again, as occurs when the rear wheels are not kept in the neutral steering position. Moreover, steering the rear wheels only in the return-side steering direction when the vehicle is stopped precludes the rear wheels from being steered, regardless of the turning operation of the steering wheel, once the rear wheels are steered towards the neutral steering position. This allows curbing tire wear in the rear wheels.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Figure 1:
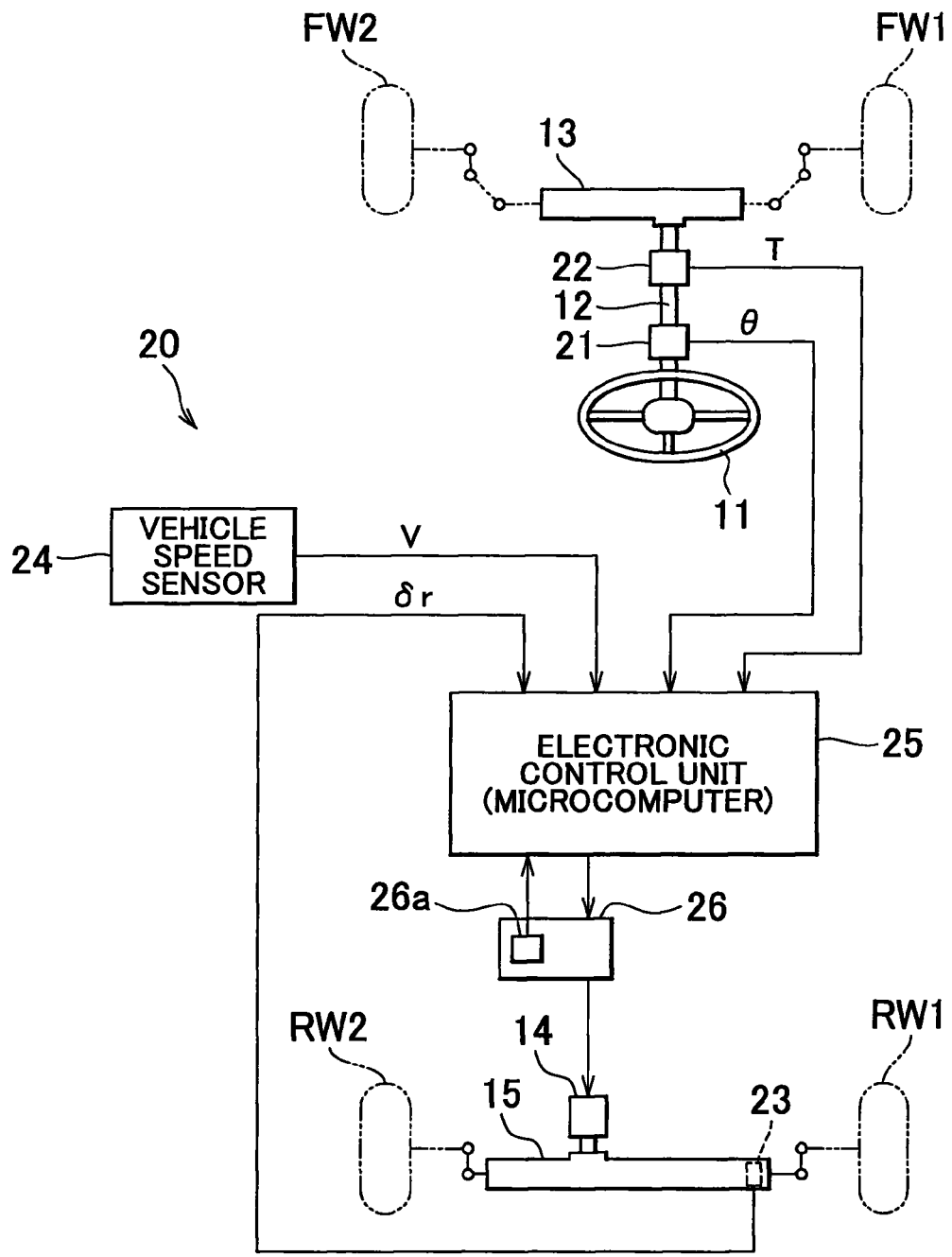
FIG. 1 is an overall schematic diagram of a vehicle equipped with a vehicle steering apparatus according to an embodiment of the invention.

A vehicle steering apparatus according to an embodiment of the invention is explained in detail below with reference to accompanying drawings. FIG. 1 illustrates schematically a vehicle equipped with a vehicle steering apparatus according to the present embodiment.

The vehicle steering apparatus is provided with a steering wheel 11 that is turned by the driver. The steering wheel 11 is fixed to the upper end of a steering shaft 12, the lower end of which is provided with, for instance, a rack and pinion mechanism, and is connected to a front wheel-side steering mechanism 13 having an assist motor for assisting the turning operation of the steering wheel 11 by the driver. The front wheel-side steering mechanism 13 converts the rotary motion of the steering shaft 12 into axial direction motion in the vehicle left-right direction, to steer, left and right, left-right front wheels FW1, FW2 that are connected by way of tie rods and knuckle arms not shown.

The vehicle steering apparatus can steer left-right rear wheels RW1, RW2 in accordance with the steering of the left-right front wheels FW1, FW2. Thus, the vehicle steering apparatus is provided with an electric motor 14 as an actuator that generates a rotational driving force for steering the left-right rear wheels RW1, RW2, and a rear wheel-side steering mechanism 15 that steers the left-right rear wheels RW1, RW2 by way of the rotational driving of the electric motor 14. The electric motor 14 and the rear wheel-side steering mechanism 15 according to the present embodiment constitute the rear wheel-side steering driving mechanism. The rear wheel-side steering mechanism 15, provided with a conventional gear mechanism, reduces the rotational speed of the electric motor 14, and converts the rotational motion thus decelerated into axial direction motion. The rear wheel-side steering mechanism 15 is connected to the left-right rear wheels RW1, RW2 by way of, for instance, a toe control arm. In particular, the left-right rear wheels RW1, RW2 are attached to the vehicle body by way of a conventional suspension mechanism (for instance, a multi-link suspension) not shown.

In the left-right rear wheels RW1, RW2 having such a construction, the electric motor 14 rotates in response to the turning operation of the steering wheel 11 by the driver, i.e. in accordance with the steering of the left-right front wheels FW1, FW2. The decelerated rotation is converted into axial direction motion by the rear wheel-side steering mechanism 15. The axial direction motion is transmitted to a toe control arm and causes the left-right rear wheels RW1, RW2, connected to the control arm, to be steered left and right.

An electric controller 20 that controls the rotational driving of the electric motor 14 will be explained next. The electric controller 20 is provided with a steering angle sensor 21, a steering torque sensor 22, a rear wheel steering angle sensor 23 and a vehicle speed sensor 24.

The steering angle sensor 21 is attached to the steering shaft 12 and detects, as a steering angle θ, the rotation angle of the steering wheel 11 (steering shaft 12) operated by the driver. The steering torque sensor 22 is also attached to the steering shaft 12 and detects, as a steering torque T, the torque inputted to the steering wheel 11 (steering shaft 12) by the driver. The steering angle sensor 21 outputs "0" as the steering angle θ when detecting that the steering wheel 11 (steering shaft 12) is in a neutral (center) operating position, outputs a positive value of the steering angle θ for a leftward turn of the steering wheel 11 (steering shaft 12), and outputs a negative value of the steering angle θ for a rightward turn of the steering wheel 11 (steering shaft 12). The steering torque sensor 22 outputs a positive value of steering torque T for a leftward turn of the steering wheel 11 (steering shaft 12), and outputs a negative value of the steering torque T for a rightward turn of the steering wheel 11 (steering shaft 12).

The rear wheel steering angle sensor 23 is attached to the rear wheel-side steering mechanism 15, and detects, for instance, axial direction displacements, relative to the vehicle body, of a rack bar in the rear wheel-side steering mechanism 15. On the basis of the detected axial direction displacement, the rear wheel steering angle sensor 23 outputs, as a steering angle δr, a steering amount of the left-right rear wheels RW1, RW2. The rear wheel steering angle sensor 23 outputs "0" as the steering angle δr when the left-right rear wheels RW1, RW2 are in a neutral steering position, outputs a positive value of the steering angle δr in response to a leftward turning operation of the left-right rear wheels RW1, RW2, and outputs a negative value of the steering angle δr in response to a rightward turning operation of the left-right rear wheels RW1, RW2. The vehicle speed sensor 24 detects and outputs a vehicle speed V.

The various sensors 21 to 24 are connected to an electronic control unit 25. The electronic control unit 25 has a microcomputer, provided with a Central Processing Unit (CPU), Read Only Memory (ROM), Random Access Memory (RAM), a timer and the like, as a main constituent component. The electronic control unit 25 controls the operation of the electric motor 14 by executing programs that include the below-described program. To that end, a driving circuit 26 for rotationally driving the electric motor 14 is connected to the output side of the electronic control unit 25. A current detector 26a, for detecting the driving current flowing into the electric motor 14, is provided in the driving circuit 26. In order to control the rotational driving of the electric motor 14, the driving current detected by the current detector 26a is fed back to the electronic control unit 25.

When the driver turns the steering wheel 11 in a vehicle having the above configuration, the turning operation is transmitted to the front wheel-side steering mechanism 13, via the steering shaft 12, and the left-right front wheels FW1, FW2 are steered. As a result, the vehicle can swerve in accordance with the turning operation of the steering wheel 11 by the driver. In order to improve vehicle handleability at low speeds, or in order to stabilize vehicle behavior during straight running and during swerving at medium and high speeds, the electronic control unit 25 executes a program, not shown, to calculate a target steering amount (target steering angle) of the left-right rear wheels RW1, RW2 in accordance with the steering of the left-right front wheels FW1, FW2, and controls the steering of the left-right rear wheels RW1, RW2 so as to achieve the target steering amount (target steering angle). In the explanation below, ordinary steering control denotes steering control of the left-right rear wheels RW1, RW2 by the electronic control unit 25 at low, medium and high speeds, i.e. when the vehicle is cruising.

The electronic control unit 25 controls the driving circuit 26 to rotationally drive thereby the electric motor 14, in order to steer the left-right rear wheels RW1, RW2 to the target steering amount (target steering angle). In the rotational driving control of the electric motor 14, the electronic control unit 25 steers the left-right rear wheels RW1, RW2 up to the target steering amount (target steering angle) using the rear wheel steering angle δr corresponding to the steering amount, on the basis of the neutral steering position detected by the rear wheel steering angle sensor 23.

When the driver turns the steering wheel 11 with the vehicle in a stop state, i.e. with the vehicle speed V detected by the vehicle speed sensor 24 at "0", a situation arises in which the left-right front wheels FW1, FW2 are steered, and the electronic control unit 25 steers the left-right rear wheels RW1, RW2 in response to turning operation of the steering wheel 11. A substantial force is required thereupon for steering the left-right rear wheels RW1, RW2 when the vehicle is in a stop state (hereinafter, this kind of steering is referred to as stationary steering). In other words, there must be increased the force that the electric motor 14 applies to the rear wheel-side steering mechanism 15, more specifically, the thrust that the electric motor 14 exerts for displacing, in the axial direction, the rack bar in the rear wheel-side steering mechanism 15.

A large-output electric motor 14 must be used in such cases to generate substantial thrust. This is likely to involve a larger electric motor 14 itself. Moreover, using a large-output electric motor 14 results in greater power consumption, in particular in increased power consumption, which may be excessive for the power source, on the part of the assist motor and the electric motor 14 during stationary steering of the left-right front wheels FW1, FW2 and the left-right rear wheels RW1, RW2. For this reason, stationary steering of the left-right rear wheels RW1, RW2 is ordinarily not performed in four-wheel steering vehicles where the left-right front wheels FW1, FW2 and the left-right rear wheels RW1, RW2 are steered.

When the driver turns the steering wheel 11, stops the vehicle, and then returns the steering wheel 11 to the neutral operating position, the left-right front wheels FW1, FW2 are steered to the neutral steering position. However, the left-right rear wheels RW1, RW2 may remain steered to a steering position removed from the neutral steering position, if stationary steering of the left-right rear wheels RW1, RW2 is not performed, as mentioned above. Thus, the aesthetics of the stopped vehicle is marred by the left-right rear wheels RW1, RW2 that remain alone in a steered state. Moreover, the vehicle follows a meandering trajectory for an instant when it starts moving again, even if the steering wheel 11 is at the neutral operating position.

Figure 2:
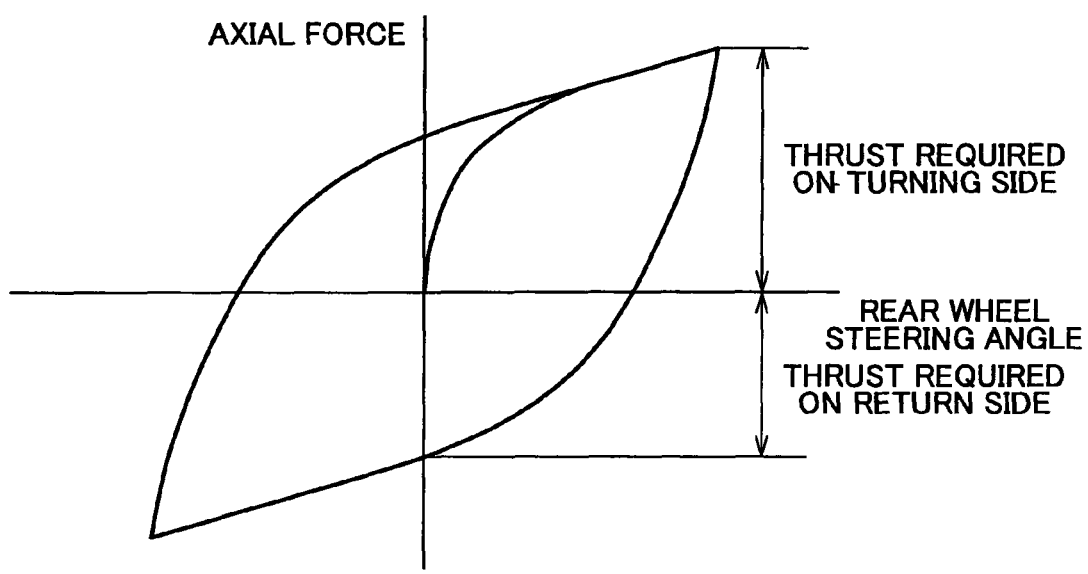
FIG. 2 is a graph illustrating the relationship between required axial force and rear wheel steering angle when rear wheels are stationarily steered against the frictional force of tires and the road surface.

When the left-right rear wheels RW1, RW2 are stationarily steered against the frictional force of the road surface and the tires of the left-right rear wheels RW1, RW2, the force (axial force) required for the rack bar of the rear wheel-side steering mechanism 15 to be displaced in the axial direction changes ordinarily as illustrated in FIG. 2. Specifically, the axial force is greater when the left-right rear wheels RW1, RW2 are steered to a side at which the absolute value of the steering angle increases (hereinafter, turning side), than when the left-right rear wheels RW1, RW2 are steered to a side at which the absolute value of the steering angle decreases (hereinafter, return side), as illustrated in FIG. 2.

The left-right rear wheels RW1, RW2 are attached to the vehicle body by way of a suspension mechanism. Therefore, the left-right rear wheels RW1, RW2 are steered against the elastic force of an elastic member (specifically, a bush) that is used in the suspension mechanism. The elastic force of the elastic member exerts a greater influence on the axial force, in particular, when the suspension mechanism is a multi-link suspension mechanism. When a multi-link suspension mechanism is used, therefore, the axial force required for the rack bar of the rear wheel-side steering mechanism 15 to be displaced in the axial direction against the elastic force of the elastic member changes as illustrated in FIG. 3.

Figure 3:
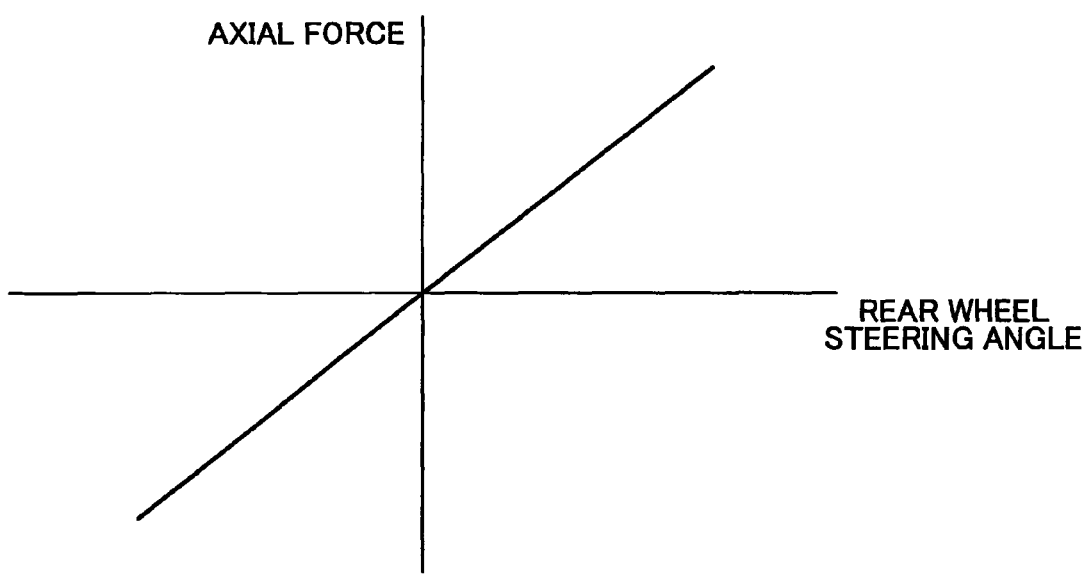
FIG. 3 is a graph illustrating the relationship between required axial force and rear wheel steering angle when rear wheels are stationarily steered against the elastic force of an elastic member (bush) of a suspension mechanism.
Figure 4:
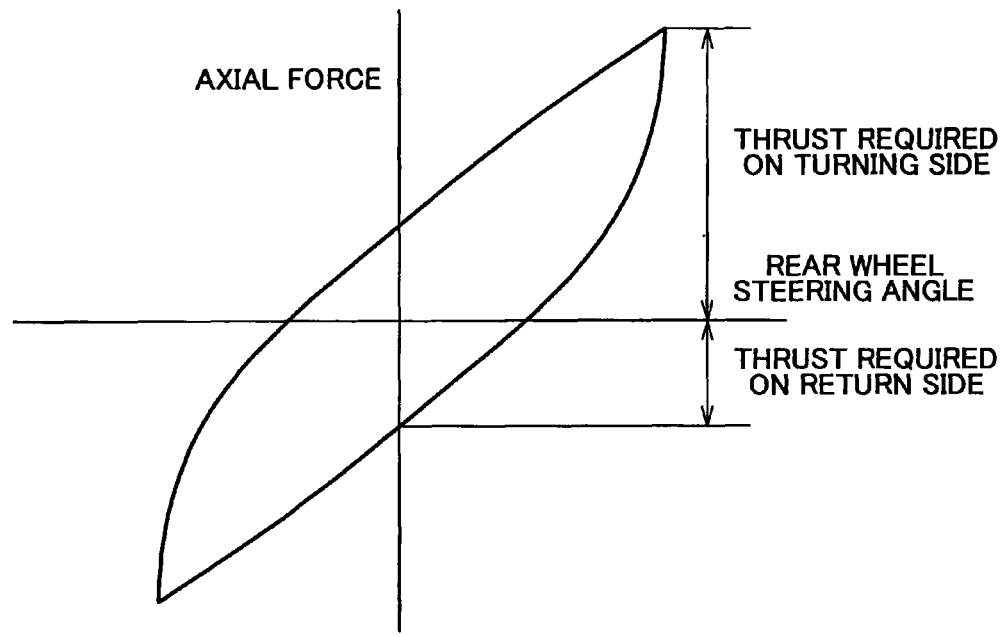
FIG. 4 is a graph illustrating the relationship between required axial force and rear wheel steering angle when rear wheels are stationarily steered against the frictional force of tires and the road surface and against the elastic force of an elastic member (bush) of a suspension mechanism.

Upon stationary steering of the left-right rear wheels RW1, RW2 attached to the vehicle body by way of a multi-link suspension mechanism, therefore, the axial force required for the rack bar of the rear wheel-side steering mechanism 15 to be displaced in the axial direction exhibits the change characteristic illustrated in FIG. 4, which is a composition of the change characteristic of the axial force illustrated in FIG. 2 and the axial force illustrated in FIG. 3. In this case, as FIG. 4 clearly shows, the axial force required for the rack bar of the rear wheel-side steering mechanism 15 to be displaced in the axial direction is greater at the turning side, as compared with the charge characteristic of the axial force illustrated in FIG. 2. This means that the thrust generated by the electric motor 14 for stationary steering of the left-right rear wheels RW1, RW2 is greater at the turning side than at the return side.

Figure 5:
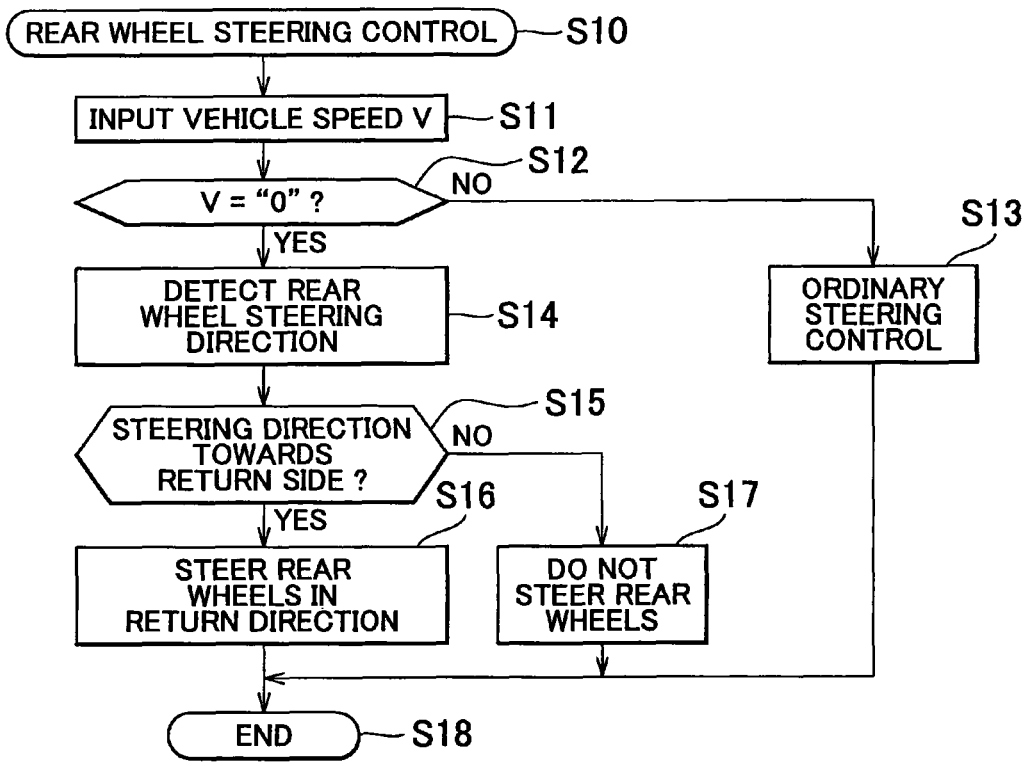
FIG. 5 is a flowchart of a rear wheel steering control program executed by an electronic control unit of FIG. 1.

Such being the case, the electronic control unit 25 executes the rear wheel steering control program illustrated in FIG. 5, whereby the left-right rear wheels RW1, RW2 are steered only to the return side when the vehicle is stopped. The rear wheel steering control program is explained in detail next.

When the driver turns on an ignition switch not shown, the electronic control unit 25 starts executing the rear wheel steering control program at step S10. In step S11, the detected vehicle speed V is inputted to the electronic control unit 25, which determines in the subsequent step S12 whether the inputted vehicle speed V is "0". If the electronic control unit 25 determines that the inputted vehicle speed V is not "0", i.e. that the vehicle is cruising at low, medium or high speed, the electronic control unit 25 determines "No", and the program moves to step S13.

In step S13, the electronic control unit 25 steers the left-right rear wheels RW1, RW2 through ordinary steering control, as described above. Specifically, if the vehicle is not in a stop state, the left-right rear wheels RW1, RW2 are steered to the turning side and the return side.

On the other hand, when the inputted detected vehicle speed V is "0", i.e. when the vehicle is stopped, the electronic control unit 25 determines "Yes", and steps from step S14 onwards are executed. Specifically, the electronic control unit 25 controls the stationary steering operation of the left-right rear wheels RW1, RW2. The process from step S14 onwards is explained next.

In step S14, the electronic control unit 25 detects the steering direction in which the left-right rear wheels RW1, RW2 are steered. Specifically, the electronic control unit 25 detects the direction in which the driver turns the steering wheel 11 (i.e. the steering direction of the left-right front wheels FW1, FW2) based on the steering angle $\theta$ detected by the steering angle sensor 21 or the steering torque T detected by the steering torque sensor 22. The electronic control unit 25 detects the steering direction of the left-right rear wheels RW1, RW2 on the basis of the turning operation direction of the steering wheel 11.

Specifically, the electronic control unit 25 detects that the steering wheel 11 is being returned towards the neutral operating position when, for instance, the product of the detected steering angle $\theta$ and the time derivative thereof, i.e. the steering angle speed $\theta'$, is a negative value, and detects that the steering wheel 11 is being turned in a direction away from the neutral operating position when the product of the detected steering angle $\theta$ and the steering angle speed $\theta'$ is a positive value. Also, the electronic control unit 25 detects that the steering wheel 11 is being returned towards the neutral steering position when, for instance, the detected steering angle $\theta$ is positive and the torque variation with time $\Delta T$ is negative, or when the detected steering angle $\theta$ is negative and the torque variation with time $\Delta T$ is positive, and detects that the steering wheel 11 is being turned in a direction away from the neutral steering position when both the detected steering angle $\theta$ and the torque variation with time $\Delta T$ are positive, or when both the detected steering angle $\theta$ and the torque variation with time $\Delta T$ are negative.

Upon detecting that the driver is returning the steering wheel 11, with the vehicle in a stop state, the electronic control unit 25 detects that both the left-right front wheels FW1, FW2 and the left-right rear wheels RW1, RW2 are steered to the return side, toward the neutral steering position, in response to the return operation of the steering wheel 11. Upon detecting that the driver is turning the steering wheel 11, with the vehicle in a stop state, the electronic control unit 25 detects that both the left-right front wheels FW1, FW2 and the left-right rear wheels RW1, RW2 are steered to the turning side, away from the neutral steering position, in response to the turning operation of the steering wheel 11. Having detected thus the steering direction of the left-right rear wheels RW1, RW2, the electronic control unit 25 proceeds to step S15.

In step S15, the electronic control unit 25 determines whether the steering direction of the left-right rear wheels RW1, RW2 detected in step S14 is towards the return side. If the electronic control unit 25 detects that the left-right rear wheels RW1, RW2 are being steered to the return side, the electronic control unit 25 determines "Yes" and proceeds to step S16. If the electronic control unit 25 detects that the left-right rear wheels RW1, RW2 are being steered to the turning side, the electronic control unit 25 determines "No" and proceeds to step S17. Step S14 and step S15 of the rear wheel steering control program according to the present embodiment constitute the steering direction determining means of the invention.

In step S16, the electronic control unit 25 steers the left-right rear wheels RW1, RW2 towards the neutral steering position, i.e. towards the return side. To steer the left-right rear wheels RW1, RW2 up to the neutral steering position, specifically, the electronic control unit 25 controls the driving circuit 26 to rotationally drive thereby the electric motor 14, on the basis of the driving current detected by the current detector 26a. In the control of the rotational driving of the electric motor 14, the electronic control unit 25 steers the left-right rear wheels RW1, RW2 up to the neutral steering position using the rear wheel steering angle $\delta r$ detected by the rear wheel steering angle sensor 23. As described above, the elastic force of the elastic member of the suspension mechanism acts on the wheels when these are steered to the return side. The thrust generated by the electric motor 14 becomes smaller as a result, which allows curbing increases in power consumption.

The electronic control unit 25 moves to step 18 and temporarily terminates execution of the program when the left-right rear wheels RW1, RW2 are steered to the neutral steering position. After a predetermined short while, execution of the program is resumed at step S10.

In step S17, by contrast, the electronic control unit 25 does not steer the left-right rear wheels RW1, RW2. Specifically, the electronic control unit 25 does not steer the left-right rear wheels RW1, RW2 to the turning side, with the vehicle in a stop state, even if the driver is turning the steering wheel 11. As a result, power is not consumed, since the left-right rear wheels RW1, RW2 are not steered to the turning side, in which case the thrust generated by the electric motor 14 is greater than when the left-right rear wheels RW1, RW2 are steered to the return side, as described above.

The electronic control unit 25 moves to step S18 and terminates temporarily the execution of the program. After a predetermined short while, execution of the program is resumed at step S10.

As made clear in the above explanation, the left-right rear wheels RW1, RW2 are stationarily steered in the present embodiment only towards the return side when the vehicle is stopped. This allows reducing the output (thrust) required from the electric motor 14 to steer the left-right rear wheels RW1, RW2, and allows hence reducing the size of the electric motor 14 while substantially curbing power consumption.

Moreover, the left-right rear wheels RW1, RW2 can be steered (stationarily steered) towards the return side, up to the neutral steering position, using the electric motor 14. This allows simplifying as a result the construction of the rear wheel-side steering mechanism 15, since no centering spring need to be provided in the latter.

Stationarily steering the left-right rear wheels RW1, RW2 only towards the return side, with the vehicle in a stop state, allows the left-right rear wheels RW1, RW2 to be held in the neutral steering position. This allows preserving the aesthetics of the stopped vehicle and preventing the vehicle from meandering when the latter starts moving again. Moreover, once the left-right rear wheels RW1, RW2 are steered towards the neutral steering position, with the vehicle in a stop state, the left-right rear wheels RW1, RW2 are precluded from being stationarily steered, regardless of the turning operation of the steering wheel 11. This allows curbing tire wear, for instance.

The invention can be embodied in ways that are not limited to the above-described embodiments, to which numerous modifications can be made without departing from the scope of the invention.

In the above embodiment, the electric motor 14 steers directly the left-right rear wheels RW1, RW2 by displacing, in the axial direction, a rack bar of the rear wheel-side steering mechanism 15. Needless to say, however, the left-right rear wheels RW1, RW2 may be steered using some other electric actuator or mechanism (for instance, a hydraulic mechanism), instead of the electric motor 14. The same effect elicited in the above embodiment can be expected to be achieved in this case as well, since the required output (axial force) with the vehicle in a stop state can be reduced by stationarily steering the left-right rear wheels RW1, RW2 only towards the return side. Needless to say, however, the invention may be used in four-wheel steering apparatuses.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

The invention claimed is:

1. A vehicle steering apparatus having a steering wheel operated by a driver, and a rear wheel-side steering driving mechanism provided with an actuator that steers rear wheels in accordance with operation of the steering wheel, comprising:
   a vehicle speed detection portion configured to detect a vehicle speed;
   a vehicle stop state determining portion configured to determine whether the vehicle is in a stop state on the basis of the vehicle speed detected by the vehicle speed detection portion;
   a steering direction determining portion configured to determine a steering direction of the rear wheels when the vehicle stop state determining portion determines that the vehicle is in the stop state; and
   a steering control portion configured to, when the vehicle is in the stop state, steer the rear wheels in a return-side steering direction to a neutral steering position by operating an actuator of the rear wheel-side steering driving mechanism when the steering direction determining portion determines that the steering direction of the rear wheels is the return-side steering direction to obtain the neutral steering position for preserving a straight running state of the vehicle.

2. The vehicle steering apparatus according to claim 1, wherein the steering control portion is configured to discontinue the operation of the actuator of the rear wheel-side steering driving mechanism when the steering direction determining portion determines that the steering direction of the rear wheels is a turning-side steering direction directed away from the neutral steering position.

3. The vehicle steering apparatus according to claim 1, wherein the steering direction determining portion is configured to determine the steering direction of the rear wheels on the basis of an operation direction of the steering wheel.

4. The vehicle steering apparatus according to claim 1, wherein the actuator of the rear wheel-side steering driving mechanism is a motor that generates a driving force for steering the rear wheels.

5. The vehicle steering apparatus according to claim 1, wherein when the steering direction determining portion determines that the steering direction of the rear wheels is a return-side steering direction to obtain a neutral steering position for preserving a straight running state of the vehicle, the steering control portion is configured to steer the rear wheels in the return-side steering direction up to the neutral steering position.

6. The vehicle steering apparatus according to claim 1, wherein the vehicle steering apparatus is a four-wheel steering apparatus.

7. The vehicle steering apparatus according to claim 1, wherein the steering control portion is configured to maintain the rear wheels to be in the neutral steering position when the vehicle is in the stop state.

* * * * *